US009438451B2

United States Patent
Chen et al.

(10) Patent No.: US 9,438,451 B2
(45) Date of Patent: Sep. 6, 2016

(54) CSI-RS ANTENNA PORTS EXTENSION AND 3D CODEBOOK DESIGN

(71) Applicant: Intel Corporation, Santa Clara, CA (US)

(72) Inventors: Xiaogang Chen, Beijing (CN); Yuan Zhu, Beijing (CN); Qinghua Li, San Ramon, CA (US); Alexei V. Davydov, Nizhny Novgorod (RU); Hooman Shirani-Mehr, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 33 days.

(21) Appl. No.: 14/128,338

(22) PCT Filed: Sep. 27, 2013

(86) PCT No.: PCT/US2013/062402
§ 371 (c)(1),
(2) Date: Dec. 20, 2013

(87) PCT Pub. No.: WO2015/047333
PCT Pub. Date: Apr. 2, 2015

(65) Prior Publication Data
US 2015/0180684 A1 Jun. 25, 2015

(51) Int. Cl.
*H04B 17/24* (2015.01)
*H04L 25/03* (2006.01)
(Continued)

(52) U.S. Cl.
CPC ....... *H04L 25/03929* (2013.01); *H04B 7/0413* (2013.01); *H04B 7/0478* (2013.01); *H04B 17/24* (2015.01); *H04L 5/0048* (2013.01)

(58) Field of Classification Search
None
See application file for complete search history.

(56) References Cited

U.S. PATENT DOCUMENTS

| 2013/0044685 A1* | 2/2013 | Fong ................... H04J 11/0053 370/328 |
| 2013/0163544 A1 | 6/2013 | Lee et al. |

(Continued)

FOREIGN PATENT DOCUMENTS

| CN | 105659655 A | 6/2016 |
| WO | 2013/024350 A2 | 2/2013 |
| WO | 2013/133745 A1 | 9/2013 |

OTHER PUBLICATIONS

Lucent, Alcatel, "Considerations on CSI feedback enhancements for high-priority antenna configurations", R1-112420, 3GPP TSG-RAN WG1 #66, Aug. 22-26, 2011, 7 pages. Also available at http://www.3gpp.org/ftp/tsg_ran/wg1_rl1/TSGR1_66/Docs/.

(Continued)

*Primary Examiner* — Alex Skripnikov
(74) *Attorney, Agent, or Firm* — Alpine Technology Law Group LLC (57) ABSTRACT

A system and a method is disclosed for selecting at least one vertical precoding vector of a three-dimensional Multiple Input Multiple Output (3D-MIMO) configuration based on Channel State Information-Reference Signal (CSI-RS) information that is feedback from a wireless terminal device to an evolved Node B (eNB). The 3D-MIMO CSI-RS process is configured for a plurality of CSI-RS ports in which the plurality of CSI-RS ports that are grouped into a plurality of CSI-RS port groups and in which corresponds to the 3D arrangement of antennas. CSI configuration information for the different CSI-RS port groups can be a time-domain-based CSI-RS process, a frequency-domain-based CSI-RS process, a code-domain-based CSI-RS process, or a combination thereof. CSI-RS information is measured for each CSI-RS group and feedback for selection of the at least one vertical precoding vector.

24 Claims, 8 Drawing Sheets

(51) Int. Cl.
*H04B 7/04* (2006.01)
*H04L 5/00* (2006.01)

(56) References Cited

U.S. PATENT DOCUMENTS

| | | | | |
|---|---|---|---|---|
| 2013/0315328 A1* | 11/2013 | Liu | ................ | H04B 7/0413 |
| | | | | 375/267 |
| 2014/0192762 A1* | 7/2014 | Li | ................ | H04L 25/03929 |
| | | | | 370/329 |
| 2015/0222340 A1* | 8/2015 | Nagata | ................ | H04L 5/00 |
| | | | | 375/267 |

OTHER PUBLICATIONS

International Search Report and Written Opinion received for PCT Patent Application No. PCT/US2013/062402, mailed on May 28, 2014, 13 pages.

ZTE, "Discussion on scenarios of 3D beamforming and Massive MIMO", R1-130140, 3GPP TSG RAN WGI Meeting #72, Jan. 28, 2013-Feb. 1, 2013, 3 pages.

International Preliminary Report of Patentability received for International Application No. PCT/US2013/062402, mailed on Apr. 7, 2016, 9 pages.

* cited by examiner

CSI-RS ANTENNA PORTS EXTENSION AND 3D CODEBOOK DESIGN

TECHNICAL FIELD

Embodiments described herein are generally directed to the field of wireless communications.

BACKGROUND

Dynamic beamforming is used to increase the power of a received signal at a User Equipment (UE) in a $3^{rd}$ Generation Partnership Project (3GPP) wireless network if multiple antennas are deployed at an evolved Node B (eNB). Currently, in Release 11 (Rel. 11) of the 3GPP Technical Specification (TS) 36.211 Version 11 (V11), dynamic beamforming by an eNB is only applied in a horizontal domain even though multiple antennas may be deployed in a vertical domain at the eNB. Dynamic beamforming in the vertical domain would provide an additional degree of freedom that would provide extra flexibility for interference coordination and suppression. Moreover, three-dimensional (3D) Multiple Input Multiple Output (MIMO) techniques could be used that utilize both horizontal and vertical dimensions of a multipath channel on a user-specific basis.

BRIEF DESCRIPTION OF THE DRAWINGS

Embodiments disclosed herein are illustrated by way of example, and not by way of limitation, in the figures of the accompanying drawings in which like reference numerals refer to similar elements and in which.

It will be appreciated that for simplicity and/or clarity of illustration, elements depicted in the figures have not necessarily been drawn to scale. For example, the dimensions of some of the elements may be exaggerated relative to other elements for clarity. The scaling of the figures does not represent precise dimensions and/or dimensional ratios of the various elements depicted herein. Further, if considered appropriate, reference numerals have been repeated among the figures to indicate corresponding and/or analogous elements.

DESCRIPTION OF THE EMBODIMENTS

Embodiments of the subject matter disclosed herein relates to Channel State Information-Reference Signal (CSI-RS) ports for a three-dimensional Multiple Input Multiple Output (3D-MIMO) wireless network, measuring Channel State Information (CSI) in a 3D-MIMO wireless network based on the CSI-RS ports, selecting codebooks for configuring the CSI-RS ports of a 3D-MIMO wireless network, and UE-specific Reference signal (UERS) configuration. To illustrate the subject matter disclosed herein, an exemplary number of 32 Channel State Information-Reference Signal (CSI-RS) ports of a $3^{rd}$ Generation Partnership Project Long Term Evolution (3GPP LTE) wireless network are used. It should, however, be understood that any number of CSI-RS ports could be used and the claimed subject matter is not so limited. Moreover, it should be understood that the subject matter disclosed herein is not limited to a 3 GPP LTE wireless network, but is applicable to wireless networks in general.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments. Additionally, the word "exemplary" is used herein to mean "serving as an example, instance, or illustration." Any embodiment described herein as "exemplary" is not to be construed as necessarily preferred or advantageous over other embodiments.

Various operations may be described herein as multiple discrete operations in turn and in a manner that is most helpful in understanding the claimed subject matter. The order of description, however, should not be construed as to imply that these operations are necessarily order dependent. In particular, these operations need not be performed in the order of presentation. Operations described may be performed in a different order than the described embodiment. Various additional operations may be performed and/or described operations may be omitted in additional embodiments. Additionally, in the following description, numerous specific details are set forth to provide a thorough understanding of embodiments disclosed herein. One skilled in the relevant art will recognize, however, that the embodiments disclosed herein can be practiced without one or more of the specific details, or with other methods, components, materials, and so forth. In other instances, well-known structures, materials, or operations are not shown or described in detail to avoid obscuring aspects of the specification.

Figure 1:
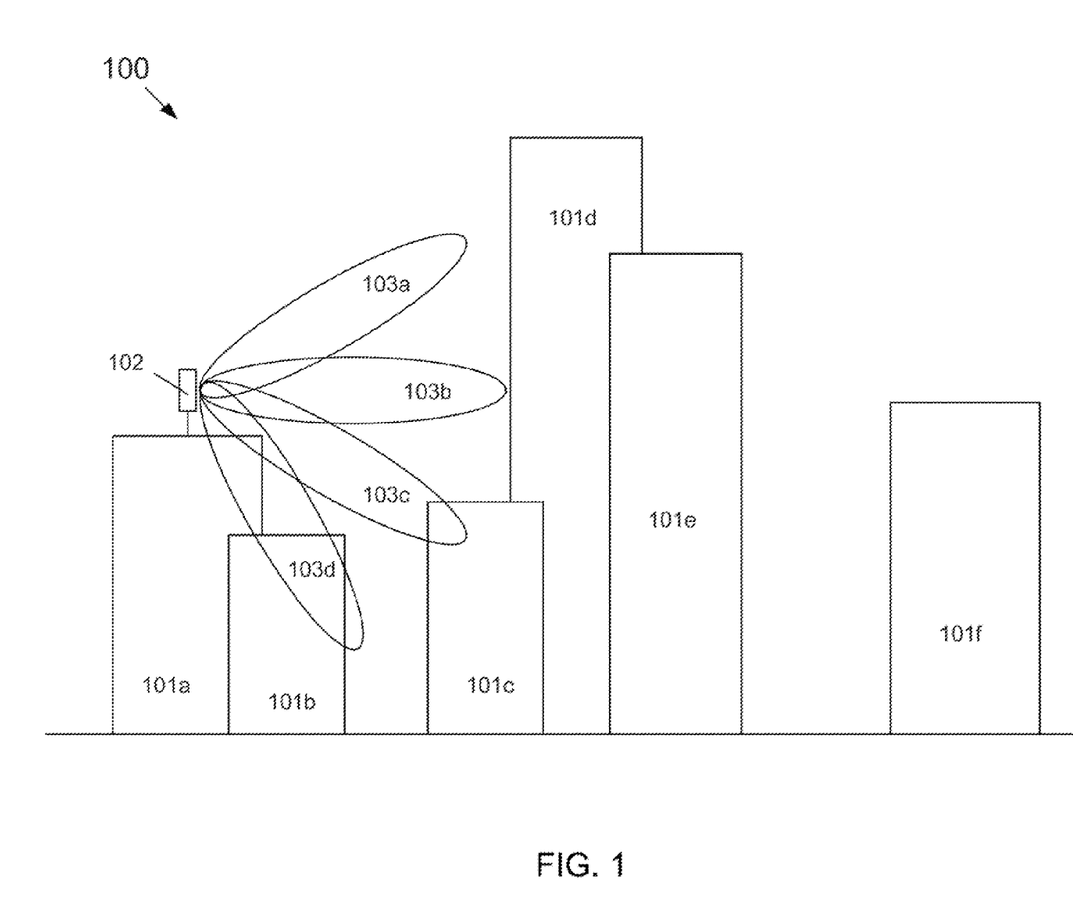
FIG. 1 depicts an exemplary embodiment of an urban environment that utilizes CSI-RS feedback information according to the subject matter disclosed herein to provide a three-dimensional (3D) Multiple Input Multiple Output (MIMO) system comprising dynamic beamforming.

FIG. 1 depicts an exemplary embodiment of an urban environment 100 that utilizes CSI-RS feedback information according to the subject matter disclosed herein to provide a three-dimensional (3D) Multiple Input Multiple Output (MIMO) system comprising dynamic beamforming. Urban environment 100 comprises a plurality of buildings 101 in which only buildings 101a-101f are depicted. An antenna array 102 is disposed on the top of building 101a. Antenna array 102 is coupled in a well-known manner to an eNB (not shown) that is capable of controlling antenna beam 103 of antenna array 102 in horizontal and vertical directions to provide dynamic 3D beamforming on a user-specific basis. In particular, the antenna beam 103 can be dynamically controlled for individual users (e.g., UEs) located within the service area provided by antenna array 102, thereby expanding and boosting both downlink and uplink coverage while providing extra flexibility for interference coordination and suppression. For example, beam 103 can be oriented in the exemplary direction indicated by beam 103a for a UE located near the top of building 101d. Similarly, beam 103 can be oriented in the exemplary directions indicated by beams 103b-103d for different UEs. Although only a few exemplary beam directions are indicated in FIG. 1, it should be understood that the claimed subject matter is not so limited.

Figure 2:
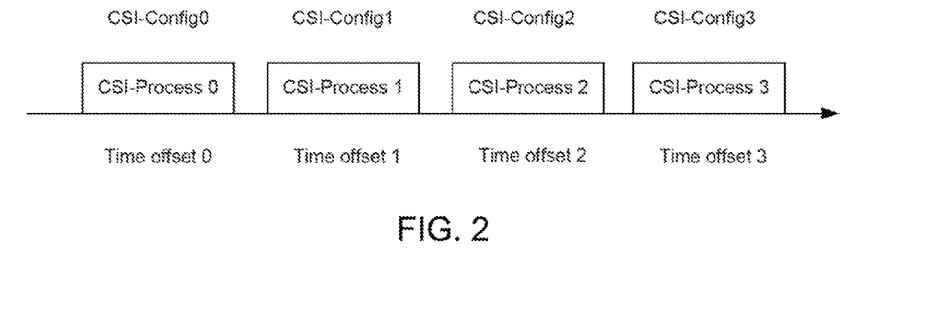
FIG. 2 depicts an exemplary embodiment of a time-domain-based CSI-RS measurement in which four different CSI-RS process groups 0-3 are measured by a UE according to the subject matter disclosed herein.

In one exemplary embodiment of the subject matter disclosed herein, a UE measures the channel for all of the 32 CSI-RS ports in which the 32 ports have been divided into different groups and the UE measures the different CSI-RS groups in different subframes of the radio frame. FIG. 2 depicts an exemplary embodiment of a time-domain-based CSI-RS measurement in which four different CSI-RS process groups 0-3 are measured by a UE according to the subject matter disclosed herein. Each respective CSI-RS process group 0-3 corresponds to eight (8) CSI-RS ports. The four different CSI-RS processes groups are respectively configured using different CSI-RS configurations 0-3 and have different time offsets 0-3 with respect to each other. In particular, each CSI process group is configured by an association of a channel part (e.g., one non-zero power CSI-RS resource in a CoMP measurement set), and an interference part in which one Channel State Information-Interference Measurement (CSI-IM) occupies four Resource Elements (Res) that are configured as a single zero-power CSI-RS configuration. It should be understood that although the exemplary 32 CSI-RS ports have been divided into four equally sized time-domain-based CSI-RS groups, it should be understood that any number of CSI-RS port groups could be formed and that different numbers of CSI-RS ports could be part of each different group.

In one exemplary embodiment, Table 1 sets forth the information that is conveyed to an UE using a UE-specific Radio Resource Control (RRC) signaling for a CSI process configuration, and Table 2 sets forth the configuration information for each non-zero CSI-RS in a CoMP measurement set. By measuring the CSI-RS resources corresponding to the four CSI-RS configurations, the UE measures the entire channel for all 32 CSI-RS ports.

TABLE 1

CSI Process Configuration Information.

| | |
|---|---|
| CSI-Process-Index | The indexing of CSI process is that each CSI process is configured with an index within a given component carrier |
| Non-Zero-Power-CSI-RS-Resource-Index | An index for indicating one non-zero power CSI-RS resource in Coordinated Multipoint (CoMP) Measurement Set. |
| CSI-IM-Index | An index for indicating one Channel State Information-Interference Measurement (CSI-IM) which occupies four (4) REs that can be configured as a zero power CSI-RS configuration. |
| Subframe_sets | Indication whether or not to apply subframe sets |
| $P_C$ | UE assumed ratio of PDSCH Energy Per Resource Element (EPRE) to CSI-RS EPRE when UE derives CSI feedback. Value in the range in the range of [−8, 15] dB with 1 dB step size. Note: when subfrane_sets are configured, $P_C$ is configured independently for each subframe set |
| Reference-RI-CSI-Process-Index | An index for indicating a reference CSI process from which RI of the CSI process inherits Rank Indicator (RI) value in the same subframe Note 1: The CSI process inheriting the RI value must be configured for the same CC as the RI-reference-process. Note 2: The RI computation for a CSI process without a reference CSI process is derived solely based on the CSI process. Note 3: reference CSI process is agreed for aperiodic feedback. For periodic feedback, it is still For Further Study (FFS). |

TABLE 2

Configuration for each non-zero power CSI-RS in CoMP measurement set.

| | |
|---|---|
| Non-zero-power-CSI-RS-resource-index | Non-zero power CSI-RS index |
| antennaPortsCount | Number of antenna ports used for transmission of CSI-RS (1, 2, 4, or 8). |
| ResourceConfig | CSI-RS configuration as defined in Table 6.10.5.2-1 and 6.10.5.2-2 of TS 36.211. |
| SubframeConfig | $I_{CSI-RS}$ as defined in Table 6.10.5.3-1 of TS 36.211. |
| $I_{CSI-RS}$ | Virtual Cell ID for CSI-RS scrambling initial state in the range of [0, 503]. |

Figure 3:
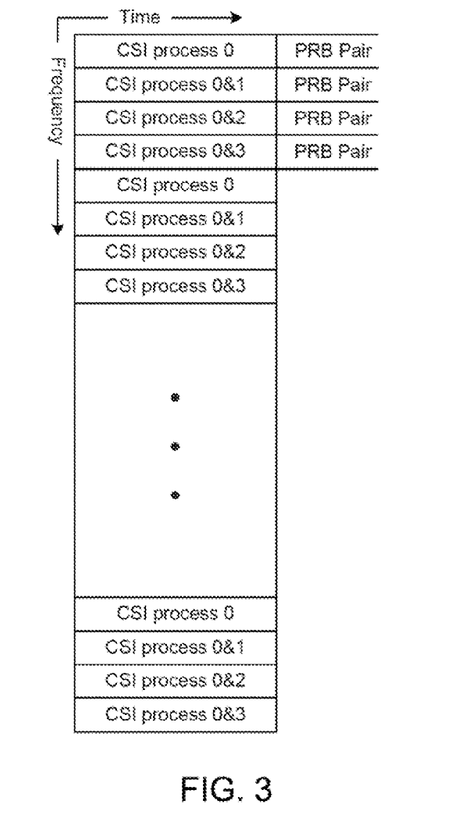
FIG. 3 depicts an exemplary embodiment of a frequency-domain-based CSI-RS measurement in which four different CSI-RS groups are measured by a UE according to the subject matter disclosed herein.

Another exemplary embodiment of the subject matter disclosed herein provides a frequency-domain-based measurement of CSI-RS. In particular. FIG. 3 depicts an exemplary embodiment of a frequency-domain-based CSI-RS measurement in which four different CSI-RS groups are measured by a UE according to the subject matter disclosed herein. Each respective CSI-RS process group corresponds to eight (8) CSI-RS ports. As depicted in FIG. 3, CSI-RS processes could be, for example, interlaced in different Physical Resource Blocks (PRBs). That is, FIG. 3 depicts one OFDM symbol in which CSI Processes 0-3 are allocated as pairs (in the time domain) and interlaced in the frequency domain. The four different CSI-RS processes groups are respectively configured using different CSI-RS configurations. In one exemplary embodiment, backward compatibility can be maintained by configuring one CSI process to include all PRBs. For example, CSI process 0 in FIG. 3 provides backward compatibility. It should be understood that although the exemplary 32 CSI-RS ports have been divided into four equally sized frequency-domain-based CSI-RS groups, it should be understood that any number of CSI-RS port groups could be formed and that different numbers of CSI-RS ports could be part of each different group.

Figure 4:
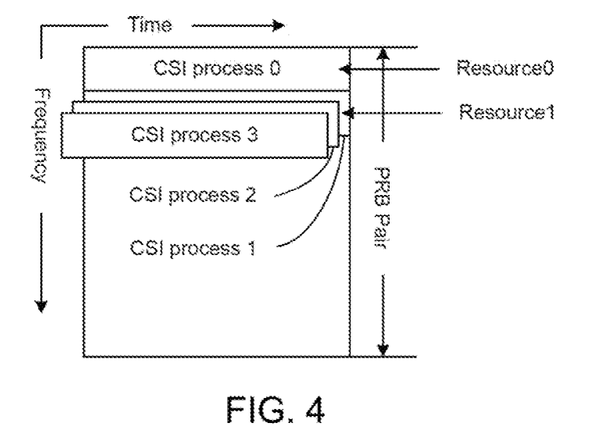
FIG. 4 depicts an exemplary embodiment of a code-domain extension of CSI-RS measurement in which four different CSI-RS groups are measured by a UE according to the subject matter disclosed herein.

Still another exemplary embodiment saves resources used by a large number of CSI-RS ports by using a code-domain-based measurement of CSI-RS. In particular, different CSI-RS resources belonging to different CSI processes are Code Division Multiplexed (CDM) with each other. FIG. 4 depicts an exemplary embodiment of a code-domain extension of CSI-RS measurement in which four different CSI-RS groups are measured by a UE according to the subject matter disclosed herein. For example, a CSI-RS sequence in Rel. 11 of the 3GPP TS 36.211 is initialized by $$c_{init}=2^{10} \cdot (7 \cdot (n_s+1)+l+1) \cdot (2 \cdot N_{ID}^{CSI}+1)+2 \cdot N_{ID}^{CSI}+N_{CP}. \quad (1)$$

$N_{ID}^{CSI}$ is configured in a well-known manner. If $N_{ID}^{CSI}$ is configured differently by eNB for each different CSI process, different CSI-RS configurations for respectively different CSI processes could be multiplexed in the same resources based on sequences having a different initialization. In order to maintain the backward compatibility, an eNB can configure at least one CSI process that is available to legacy UEs (e.g., CSI process 0), whereas other CSI process can utilize Frequency Division Multiplexed/Time Division Multiplexed (FDM/TDM) resources with other CSI processes. It should be understood that although the exemplary 32 CSI-RS ports have been divided into four equally sized code-domain-based CSI-RS groups, it should be understood that any number of CSI-RS port groups could be formed and that different numbers of CSI-RS ports could be part of each different group.

It should be understood that the exemplary time-domain-based, frequency-domain-based and code-domain-based embodiments disclosed herein can be combined to further extend the number of CSI-RS ports that can be used in a 3D-MIMO wireless network.

Figure 5:
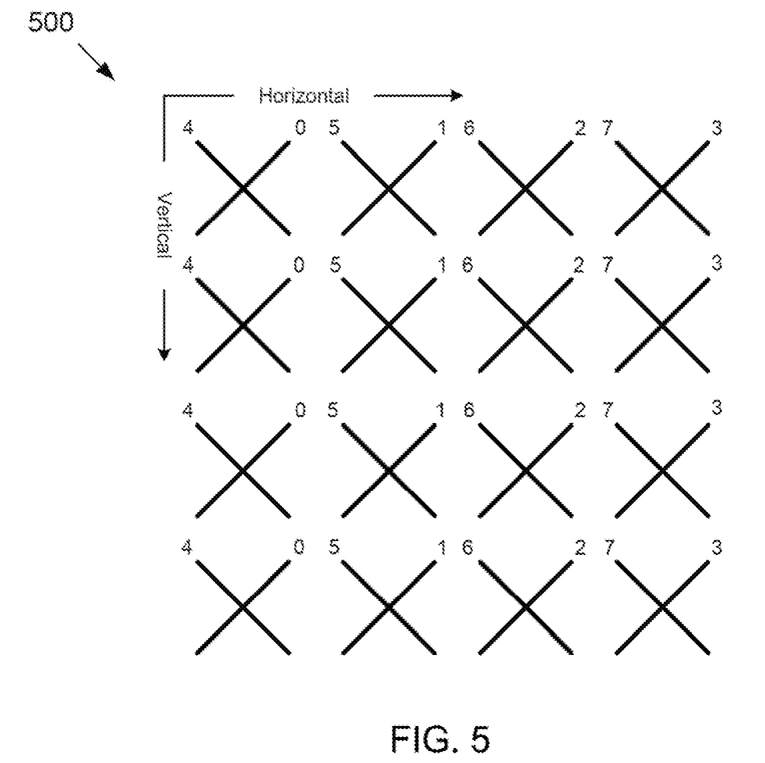
FIG. 5 depicts an exemplary three-dimensional (3D) arrangement of antenna elements.

An exemplary arrangement 500 of three-dimensional (3D) antenna elements is shown in FIG. 5, the horizontal-spatial correlation (horizontal in FIG. 5) could be characterized by an existing Rel. 10 codebook of the 3GPP TS 36.211, and the vertical-spatial correlation (vertical in FIG. 5) could be partially characterized by Discrete Fourier Transform (DFT) precoding vectors.

A conventional Rel. 10 horizontal precoding vector is expressed as $$W_H=[W_H^1, W_H^2, \ldots, W_H^{r_H}] \quad (2)$$

in which $W_H^i$ for i=1, 2, ..., $r_H$ comprises a $N_H \times 1$ vector, $N_H$ represents the number of horizontal antenna ports (eight (8) in example of FIG. 5), and in which $r_H$ represents the number of horizontal rank in MIMO transmission.

A vertical precoding vector, which is used to characterize only the antenna ports having the same index in (e.g., antennas with index 0 in FIG. 5) can be expressed by $$W_V=[W_V^1, W_V^2, \ldots, W_V^{r_V}] \quad (3)$$

in which $W_V^i$ for i=1, 2, ..., $r_V$ comprises a $N_V \times 1$ vector, $N_V$ represents the number of antenna ports having the same index (four (4) in example of FIG. 5) and in which $r_V$ represents the number of vertical rank in MIMO transmission.

Then, the 3D precoding vector could be formed as $$W_{3D}=[\text{col}(W_H^1(W_V^1)^H), \text{col}(W_H^2(W_V^1)^H), \ldots, \text{col}(W_H^{r_H}(W_V^1)^H), \ldots, \text{col}(W_H^1(W_V^{r_V})^H), \text{col}(W_H^2(W_V^{r_V})^H), \ldots, \text{col}(W_H^{r_H}(W_V^{r_V})^H)] \quad (4)$$

in which col indicates a reshaping of the matrix to a vector without changing the elements.

Vector $W_V$ could be formed by filling orthogonal Discrete Fourier Transform (DFT) codewords in the $r_V$ column. DFT vectors could be selected from the 3GPP TS 36.211 Rel. 10 codebook based on $N_V$, the number of antenna ports with same index. In one exemplary embodiment, the codewords corresponding to, for example, Codebook Indices 0-7 in column 1 of Number of Layers in Table 3, which are reproduced from section 6.3.4 of the 3GPP TS 36.211, could be used when $N_V$=4.

TABLE 3

Exemplary DFT codeword selection for $N_v = 4$

| Codebook Index | $u_n$ | Number of layers ν | | | |
|---|---|---|---|---|---|
| | | 1 | 2 | 3 | 4 |
| 0 | $u_0 = [1\ -1\ -1\ -1]^T$ | $W_0^{(1)}$ | $W_0^{(14)}/\sqrt{2}$ | $W_0^{(124)}/\sqrt{3}$ | $W_0^{(1234)}/2$ |
| 1 | $u_1 = [1\ -j\ 1\ j]^T$ | $W_1^{(1)}$ | $W_1^{(12)}/\sqrt{2}$ | $W_1^{(123)}/\sqrt{3}$ | $W_1^{(1234)}/2$ |
| 2 | $u_2 = [1\ 1\ -1\ 1]^T$ | $W_2^{(1)}$ | $W_2^{(12)}/\sqrt{2}$ | $W_2^{(123)}/\sqrt{3}$ | $W_2^{(3214)}/2$ |
| 3 | $u_3 = [1\ j\ 1\ -j]^T$ | $W_3^{(1)}$ | $W_3^{(12)}/\sqrt{2}$ | $W_3^{(123)}/\sqrt{3}$ | $W_3^{(3214)}/2$ |
| 4 | $u_4 = [1\ (-1-j)/\sqrt{2}\ -j\ (1-j)/\sqrt{2}]^T$ | $W_4^{(1)}$ | $W_4^{(14)}/\sqrt{2}$ | $W_4^{(124)}/\sqrt{3}$ | $W_4^{(1234)}/2$ |
| 5 | $u_5 = [1\ (1-j)/\sqrt{2}\ j\ (-1-j)/\sqrt{2}]^T$ | $W_5^{(1)}$ | $W_5^{(14)}/\sqrt{2}$ | $W_5^{(124)}/\sqrt{3}$ | $W_5^{(1234)}/2$ |
| 6 | $u_6 = [1\ (1+j)/\sqrt{2}\ -j\ (-1+j)/\sqrt{2}]^T$ | $W_6^{(1)}$ | $W_6^{(13)}/\sqrt{2}$ | $W_6^{(134)}/\sqrt{3}$ | $W_6^{(1324)}/2$ |
| 7 | $u_7 = [1\ (-1+j)/\sqrt{2}\ j\ (1+j)/\sqrt{2}]^T$ | $W_7^{(1)}$ | $W_7^{(13)}/\sqrt{2}$ | $W_7^{(134)}/\sqrt{3}$ | $W_7^{(1324)}/2$ |
| 8 | $u_8 = [1\ -1\ 1\ 1]^T$ | $W_8^{(1)}$ | $W_8^{(12)}/\sqrt{2}$ | $W_8^{(124)}/\sqrt{3}$ | $W_8^{(1234)}/2$ |
| 9 | $u_9 = [1\ -j\ -1\ -j]^T$ | $W_9^{(1)}$ | $W_9^{(14)}/\sqrt{2}$ | $W_9^{(134)}/\sqrt{3}$ | $W_9^{(1234)}/2$ |
| 10 | $u_{10} = [1\ 1\ 1\ -1]^T$ | $W_{10}^{(1)}$ | $W_{10}^{(13)}/\sqrt{2}$ | $W_{10}^{(123)}/\sqrt{3}$ | $W_{10}^{(1324)}/2$ |
| 11 | $u_{11} = [1\ j\ -1\ j]^T$ | $W_{11}^{(1)}$ | $W_{11}^{(13)}/\sqrt{2}$ | $W_{11}^{(134)}/\sqrt{3}$ | $W_{11}^{(1324)}/2$ |
| 12 | $u_{12} = [1\ -1\ -1\ 1]^T$ | $W_{12}^{(1)}$ | $W_{12}^{(12)}/\sqrt{2}$ | $W_{12}^{(123)}/\sqrt{3}$ | $W_{12}^{(1234)}/2$ |
| 13 | $u_{13} = [1\ -1\ 1\ -1]^T$ | $W_{13}^{(1)}$ | $W_{13}^{(13)}/\sqrt{2}$ | $W_{13}^{(123)}/\sqrt{3}$ | $W_{13}^{(1324)}/2$ |
| 14 | $u_{14} = [1\ 1\ -1\ -1]^T$ | $W_{14}^{(1)}$ | $W_{14}^{(13)}/\sqrt{2}$ | $W_{14}^{(123)}/\sqrt{3}$ | $W_{14}^{(3214)}/2$ |
| 15 | $u_{15} = [1\ 1\ 1\ 1]^T$ | $W_{15}^{(1)}$ | $W_{15}^{(12)}/\sqrt{2}$ | $W_{15}^{(123)}/\sqrt{3}$ | $W_{15}^{(1234)}/2$ |

In one exemplary embodiment, DFT vectors could alternatively be formed as $$W_V^i = \begin{bmatrix} 1 \\ \exp\left(-j2\pi\frac{d}{\lambda}\cos(\theta^i)\right) \\ \vdots \\ \exp\left(-j2\pi\frac{r_V d}{\lambda}\cos(\theta^i)\right) \end{bmatrix}, 0 < \theta^i < \pi \quad (5)$$

in which d comprises the distance between different antenna elements and λ comprises the wavelength. The number of vertical rank-1 precoding vector depends on tolerable feedback overhead. For instance, if 16 codewords are used to quantize the vertical spatial correlation, $\theta^i$ can be selected as equally or unequally sampled from 0 to π.

Figure 6:
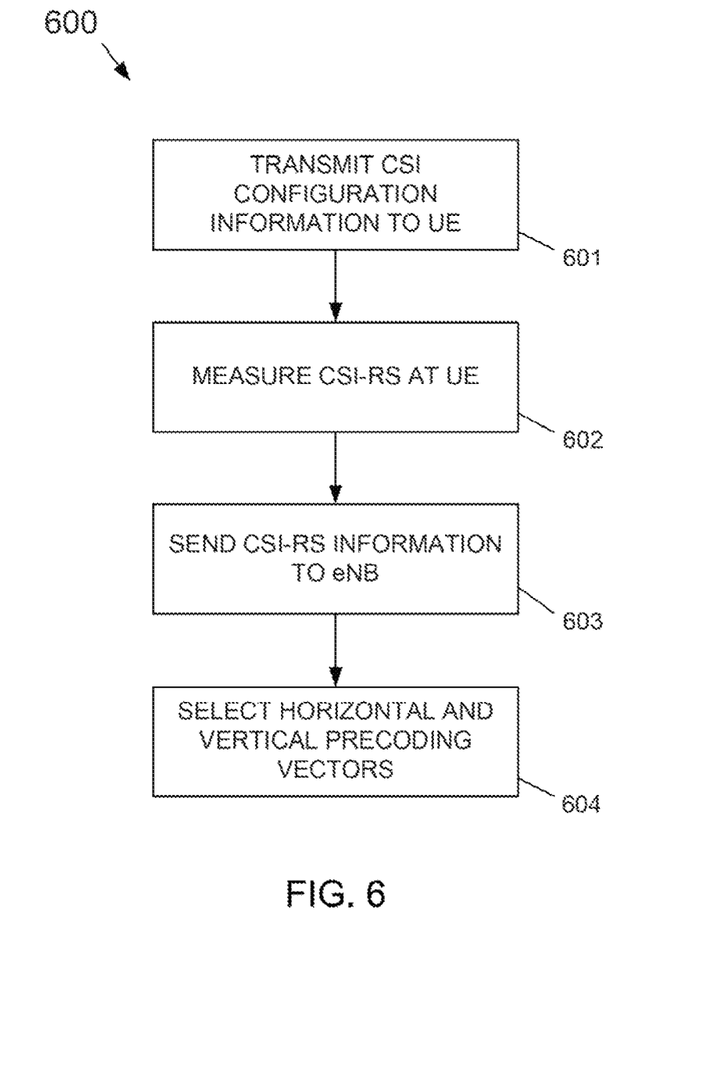
FIG. 6 depicts a flow diagram of an exemplary embodiment for transmitting Channel State Information (CSI) configuration information, measuring Channel State Information-Reference Signal (CSI-RS) information, providing CSI-RS feedback and selecting horizontal and vertical precoding vectors for a 3D MIMO wireless network according to the subject matter disclosed herein.

FIG. 6 depicts a flow diagram 600) of an exemplary embodiment for transmitting Channel State Information (CSI) configuration information, measuring Channel State Information-Reference Signal (CSI-RS) information, providing CSI-RS feedback and selecting horizontal and vertical precoding vectors for a 3D MIMO wireless network according to the subject matter disclosed herein. At 601, CSI configuration information is transmitted to one or more UEs using a well-known technique. In one exemplary embodiment the CSI ports are grouped into two or more groups in which each different group corresponds to a different CSI-RS process, and in which each respective CSI-RS process is configured using a different CSI-RS configuration. In one exemplary embodiment, the CSI configuration information configures the different CSI processes in a time-domain-based CSI-RS configuration, such as depicted in FIG. 2. In another exemplary embodiment, the CSI configuration information configures the different CSI processes in a frequency-domain-based CSI-RS configuration, such as depicted in FIG. 3. In another exemplary embodiment, the CSI configuration information configures the different CSI processes in a code-domain-based CSI-RS configuration, such as depicted in FIG. 4. In still another exemplary embodiment, the CSI configuration information configures the different CSI processes in a selective combination of a time-domain-based, a frequency-domain-based and/or a code-domain-based CSI-RS configuration.

At 602, each UE to which the CSI configuration information has been sent measures CSI-RS information. At 603, the UE provides CSI-RS feedback information to the eNB. At 604, the eNB selects horizontal and vertical precoding vectors to provide a 3D-MIMO for each respective UE.

Figure 7:
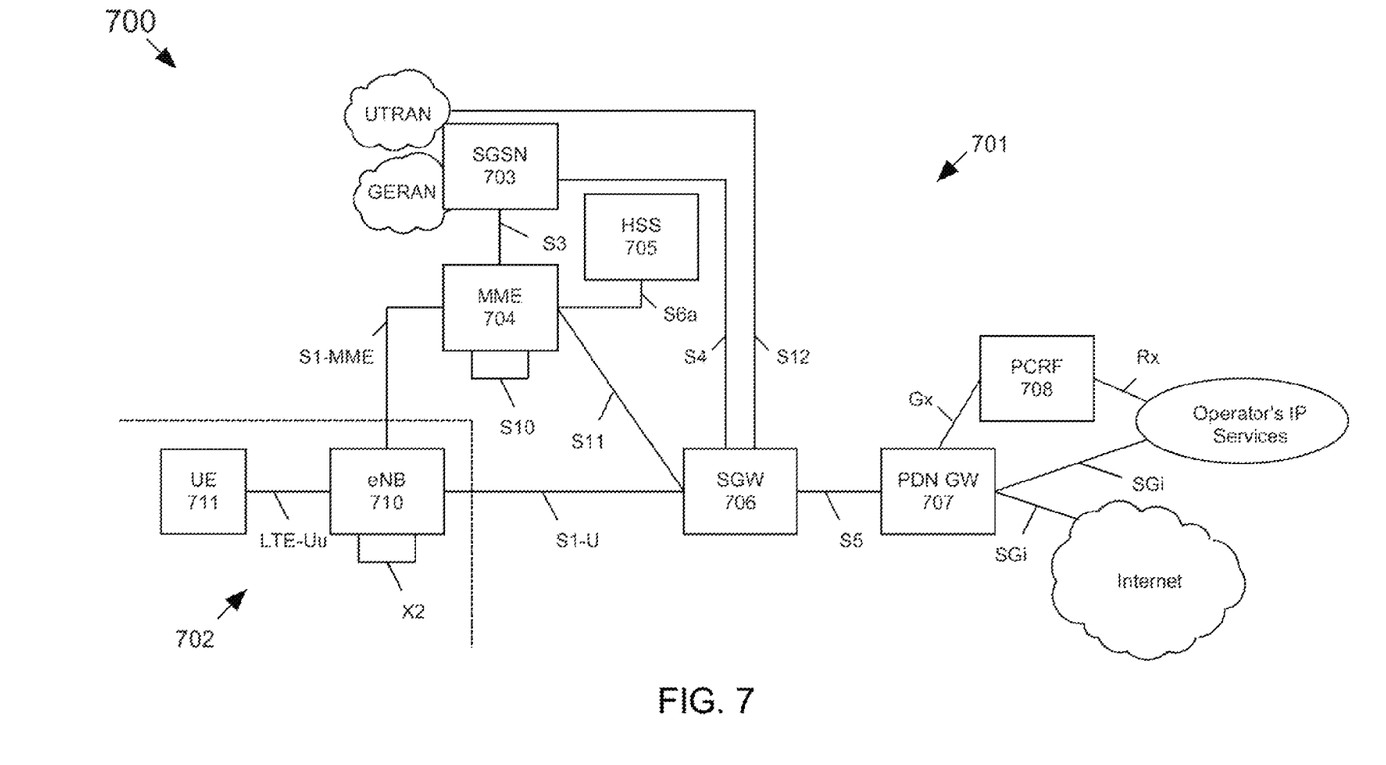
FIG. 7 shows an exemplary block diagram of the overall architecture of a 3GPP LTE network that utilizes any of the techniques disclosed herein to provide 3D-MIMO CSI-RS feedback information for selecting at least one vertical precoding vector according to the subject matter disclosed herein.

FIG. 7 shows an exemplary block diagram of the overall architecture of a 3GPP LTE network 700 that utilizes any of the techniques disclosed herein to provide 3D-MIMO CSI-RS feedback information for selecting at least one vertical preceding vector according to the subject matter disclosed herein. FIG. 7 also generally shows exemplary network elements and exemplary standardized interfaces. At a high level, network 700 comprises a core network (CN) 701601 (also referred to as an evolved Packet System (EPC)), and an air-interface access network E-UTRAN 702. CN 701 is responsible for the overall control of the various User Equipment (UE) connected to the network and establishment of the bearers. CN 701 may include functional entities, such as a home agent HA and/or an ANDSF server or entity, although not explicitly depicted. E-UTRAN 702 is responsible for all radio-related functions.

The main exemplary logical nodes of CN 701 include, but are not limited to, a Serving GPRS Support Node 703, the Mobility Management Entity 704, a Home Subscriber Server (HSS) 705, a Serving Gate (SGW) 706, a PDN Gateway 707 and a Policy and Charging Rules Function (PCRF) Manager 708. The functionality of each of the network elements of CN 701 is well known and is not described herein. Each of the network elements of CN 701 are interconnected by well-known exemplary standardized interfaces, some of which are indicated in FIG. 7, such as interfaces S3, S4, S5, etc., although not described herein.

While CN 701 includes many logical nodes, the E-UTRAN access network 702 is formed by one node, the evolved NodeB (base station (BS), eNB or eNodeB) 710, which connects to one or more User Equipment (UE) 711, of which only one is depicted in FIG. 7. UE 711 is also referred to herein as a wireless device (WD) and/or a subscriber station (SS), and can include an M2M-type device. In one exemplary configuration, a single cell of an E-UTRAN access network 702 provides one substantially localized geographical transmission point (having multiple antenna devices) that provides access to one or more UEs. In another exemplary configuration, a single cell of an E-UTRAN access network 702 provides multiple geographically substantially isolated transmission points (each having one or more antenna devices) with each transmission point providing access to one or more UEs simultaneously and with the signaling bits defined for the one cell so that all UEs share the same spatial signaling dimensioning. For normal user traffic (as opposed to broadcast), there is no centralized controller in E-UTRAN; hence the E-UTRAN architecture is said to be flat. The eNBs are normally interconnected with each other by an interface known as "X2" and to the EPC by an S1 interface. More specifically, an eNB is connected to MME 704 by an S1-MME interface and to SGW 706 by an S1-U interface. The protocols that run between the eNBs and the UEs are generally referred to as the "AS protocols." Details of the various interfaces are well known and not described herein.

The eNB 710 hosts the PHYsical (PHY), Medium Access Control (MAC), Radio Link Control (RLC), and Packet Data Control Protocol (PDCP) layers, which are not shown in FIG. 7, and which include the functionality of user-plane header-compression and encryption. The eNB 710 also provides Radio Resource Control (RRC) functionality corresponding to the control plane, and performs many functions including radio resource management, admission control, scheduling, enforcement of negotiated Up Link (UL) QoS, cell information broadcast, ciphering/deciphering of user and control plane data, and compression/decompression of DL/UL user plane packet headers.

The RRC layer in eNB 710 covers all functions related to the radio bearers, such as radio bearer control, radio admission control, radio mobility control, scheduling and dynamic allocation of resources to UEs in both uplink and downlink, header compression for efficient use as of the radio interface, security of all data sent over the radio interface, and connectivity to the EPC. The RRC layer makes handover decisions based on neighbor cell measurements sent by UE 711, generates pages for UEs 711 over the air, broadcasts system information, controls UE measurement reporting, such as the periodicity of Channel Quality Information (CQI) reports, and allocates cell-level temporary identifiers to active UEs 711. The RRC layer also executes transfer of UE context from a source eNB to a target eNB during handover, and provides integrity protection for RRC messages. Additionally, the RRC layer is responsible for the setting up and maintenance of radio bearers.

Figure 8:
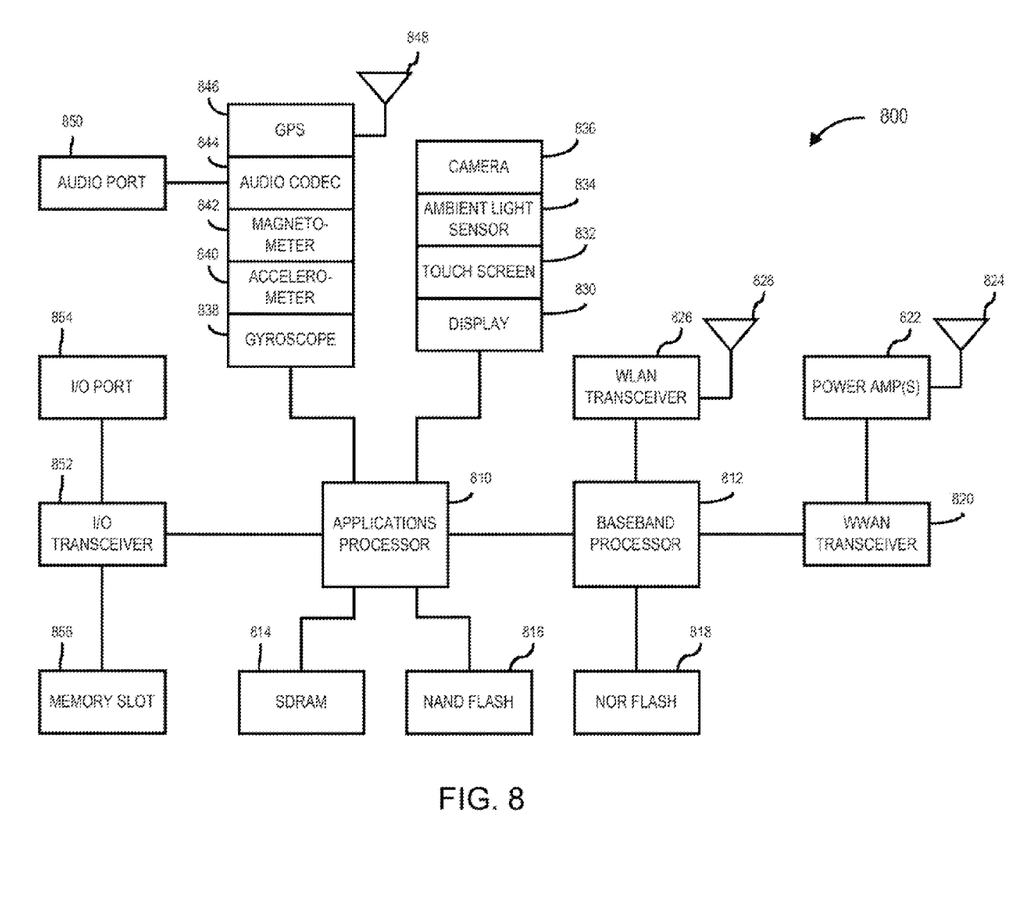
FIG. 8 depicts an exemplary functional block diagram of an information-handling system that utilizes any of the techniques disclosed herein to provide 3D-MIMO CSI-RS feedback information for selecting at least one vertical precoding vector according to the subject matter disclosed herein.

FIG. 8 depicts an exemplary functional block diagram of an information-handling system 800 that utilizes any of the techniques disclosed herein to provide 3D-MIMO CSI-RS feedback information for selecting at least one vertical precoding vector according to the subject matter disclosed herein. Information-handling system 800 of FIG. 8 may tangibly embody one or more of any of the exemplary network elements and/or functional entities of the network as shown in and described with respect to FIG. 7. Although information-handling system 800 represents one example of several types of computing platforms, such as, but not limited to, eNB 710, and for a terminal device, such as a mobile station (MS), or User Equipment (UE) 711, information-handling system 800 may include more or fewer elements and/or different arrangements of elements than shown in FIG. 8, and the scope of the claimed subject matter is not limited in these respects.

In one or more embodiments, information-handling system 800 may comprise one or more applications processor 810 and a baseband processor 812. Applications processor 810 may be utilized as a general purpose processor to run applications and the various subsystems for information-handling system 800. Applications processor 810 may include a single core or alternatively may include multiple processing cores wherein one or more of the cores may comprise a digital signal processor or digital signal processing core. Furthermore, applications processor 810 may include a graphics processor or coprocessor disposed on the same chip, or alternatively a graphics processor coupled to applications processor 810 may comprise a separate, discrete graphics chip. Applications processor 810 may include on-board memory, such as cache memory, and further may be coupled to external memory devices such as synchronous dynamic random access memory (SDRAM) 815 for storing and/or executing applications during operation, and NAND flash 816 for storing applications and/or data even when information-handling system 800 is powered off. Baseband processor 812 may control the broadband radio functions for information-handling system 800. Baseband processor 812 may store code for controlling such broadband radio functions in a NOR flash 818. Baseband processor 812 controls a wireless wide area network (WWAN) transceiver 820 which is used for modulating and/or demodulating broadband network signals, for example, for communicating via a 3GPP LTE network or the like as discussed herein with respect to FIG. 7. The WWAN transceiver 820 couples to one or more power amplifiers 822 that are respectively coupled to one or more antennas 824 for sending and receiving radio-frequency signals via the WWAN broadband network. The baseband processor 812 also may control a wireless local area network (WLAN) transceiver 826 coupled to one or more suitable antennas 828 and that may be capable of communicating via a Bluetooth-based standard, an IEEE 802.11-based standard, an IEEE 802.16-based standard, an IEEE 802.18-based wireless network standard, an LTE-based wireless network standard, a 3GPP-based protocol wireless network, a Third Generation Partnership Project Long Term Evolution (3GPP LTE) based wireless network standard, a 3GPP2 Air Interface Evolution (3GPP2 AIE) based wireless network standard, a UMTS-based protocol wireless network, a CDMA2000-based protocol wireless network, a GSM-based protocol wireless network, a cellular-digital-packet-data-based (CDPD-based) protocol wireless network, or a Mobitex-based protocol wireless network, or the like. It should be noted that these are merely example implementations for applications processor 810 and baseband processor 812, and the scope of the claimed subject matter is not limited in these respects. For example, any one or more of SDRAM 814, NAND flash 816 and/or NOR flash 818 may comprise other types of memory technology, such as magnetic-based memory, chalcogenide-based memory, phase-change-based memory, optical-based memory, or ovonic-based memory, and the scope of the claimed subject matter is not limited in this respect.

In one or more embodiments, applications processor 810 may drive a display 830 for displaying various information or data, and may further receive touch input from a user via a touch screen 832 for example via a finger or a stylus. An ambient light sensor 834 may be utilized to detect an amount of ambient light in which information-handling system 800 is operating, for example, to control a brightness or contrast value for display 830 as a function of the intensity of ambient light detected by ambient light sensor 834. One or more cameras 836 may be utilized to capture images that are processed by applications processor 810 and/or at least temporarily stored in NAND flash 816. Furthermore, applications processor may couple to a gyroscope 838, accelerometer 840, magnetometer 842, audio coder/decoder (CODEC) 844, and/or global positioning system (GPS) controller 846 coupled to an appropriate GPS antenna 848, for detection of various environmental properties including location, movement, and/or orientation of information-handling system 800. Alternatively, controller 846 may comprise a Global Navigation Satellite System (GNSS) controller. Audio CODEC 844 may be coupled to one or more audio ports 850 to provide microphone input and speaker outputs either via internal devices and/or via external devices coupled to information-handling system via the audio ports 850, for example, via a headphone and microphone jack. In addition, applications processor 810 may couple to one or more input/output (I/O) transceivers 852 to couple to one or more I/O ports 854 such as a universal serial bus (USB) port, a high-definition multimedia interface (HDMI) port, a serial port, and so on. Furthermore, one or more of the I/O transceivers 852 may couple to one or more memory slots 856 for optional removable memory, such as secure digital (SD) card or a subscriber identity module (SIM) card, although the scope of the claimed subject matter is not limited in these respects.

Figure 9:
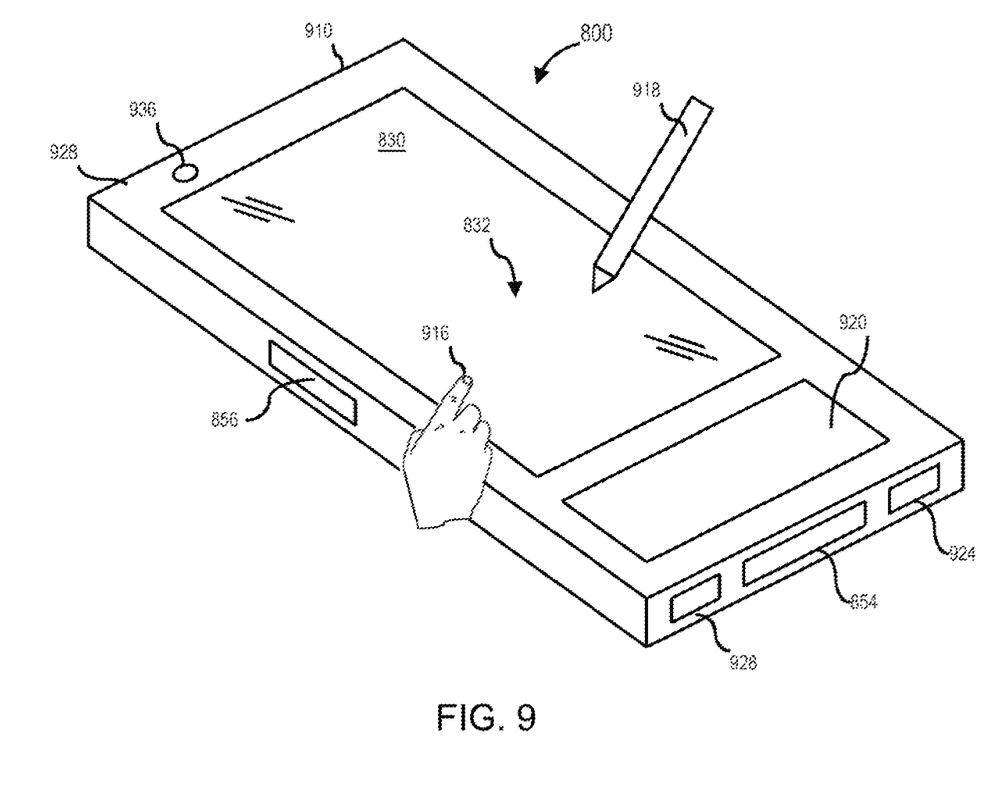
FIG. 9 depicts an isometric view of an exemplary embodiment of the information-handling system of FIG. 8 that optionally may include a touch screen in accordance with one or more embodiments.

FIG. 9 depicts an isometric view of an exemplary embodiment of the information-handling system of FIG. 8 that optionally may include a touch screen in accordance with one or more embodiments. For example, FIG. 9 shows an example implementation of information-handling system 800 of FIG. 8 tangibly embodied as a cellular telephone, smartphone, or tablet-type device or the like. In one or more embodiments, the information-handling system 800 may comprise a housing 910 having a display 830 that may include a touch screen 832 for receiving tactile input control and commands via a finger 916 of a user and/or a via stylus 818 to control one or more applications processors 810. The housing 910 may house one or more components of information-handling system 800, for example, one or more applications processors 810, one or more of SDRAM 814, NAND flash 816, NOR flash 818, baseband processor 812, and/or WWAN transceiver 820. The information-handling system 800 further may optionally include a physical actuator area 920 that may comprise a keyboard or buttons for controlling information-handling system 800 via one or more buttons or switches. The information-handling system 800 may also include a memory port or slot 856 for receiving non-volatile memory, such as flash memory, for example, in the form of a secure digital (SD) card or a subscriber identity module (SIM) card. Optionally, the information-handling system 800 may further include one or more speakers and/or microphones 924 and a connection port 854 for connecting the information-handling system 800 to another electronic device, dock, display, battery charger, and so on. Additionally, information-handling system 800 may include a headphone or speaker jack 928 and one or more cameras 936 on one or more sides of the housing 910. It should be noted that the information-handling system 800 of FIGS. 8 and 9 may include more or fewer elements than shown, in various arrangements, and the scope of the claimed subject matter is not limited in this respect.

Figure 10:
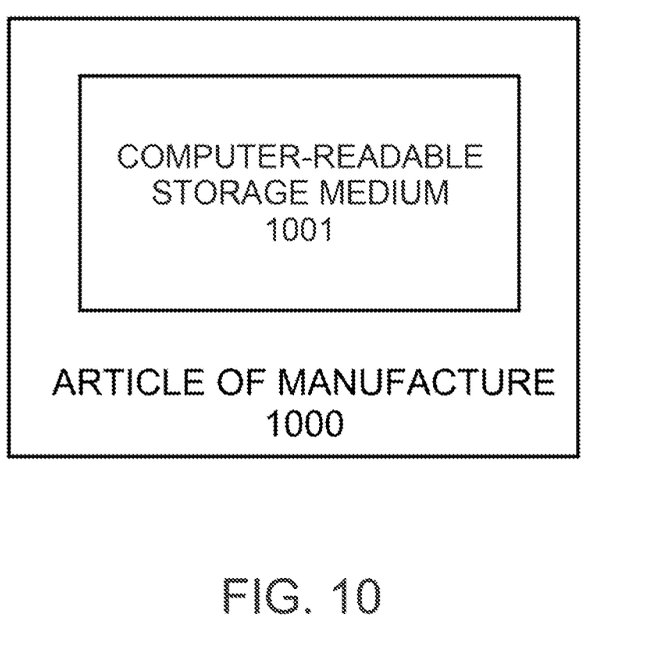
FIG. 10 depicts an exemplary embodiment of an article of manufacture comprising a non-transitory computer-readable storage medium having stored thereon computer-readable instructions that, when executed by a computer-type device, results in any of the various techniques and methods according to the subject matter disclosed herein.

FIG. 10 depicts an exemplary embodiment of an article of manufacture 1000 comprising a non-transitory computer-readable storage medium 1001 having stored thereon computer-readable instructions that, when executed by a computer-type device, results in any of the various techniques and methods according to the subject matter disclosed herein. Exemplary computer-readable storage mediums that could be used for computer-readable storage medium 1001 could be, but are not limited to, a semiconductor-based memory, an optically based memory, a magnetic-based memory, or a combination thereof.

These modifications can be made in light of the above detailed description. The terms used in the following claims should not be construed to limit the scope to the specific embodiments disclosed in the specification and the claims. Rather, the scope of the embodiments disclosed herein is to be determined by the following claims, which are to be construed in accordance with established doctrines of claim interpretation.

The invention claimed is:

1. A method to measure Channel State Information-Reference Signal (CSI-RS) information for a three-dimensional Multiple Input Multiple Output (3D-MIMO) configuration of a $3^{rd}$ Generation Partnership Project Long Term Evolution (3GPP LTE) wireless network, the method comprising:

receiving at a wireless terminal device Channel State Information (CSI) configuration information for a plurality of CSI-RS ports, the plurality of CSI-RS ports corresponding to a 3D arrangement of antennas and being grouped into a plurality of CSI-RS port groups, wherein the plurality of CSI-RS ports comprises greater than eight CSI-RS ports, and wherein each of the plurality of CSI-RS port groups comprises a corresponding CSI process;

measuring at the wireless terminal device CSI-RS information corresponding to each respective CSI-RS group, wherein a first combination of the CSI processes is performed in a first group of physical resource blocks, and a second combination of the CSI processes performed in a second group of physical resource blocks, the second combination being different from the first combination, until CSI-RS measurements have been obtained for the greater than eight CSI-RS ports; and sending from the wireless terminal device the CSI-RS information as feedback for selecting at least one vertical precoding vector for configuring the CSI-RS ports of the 3D antenna arrangement.

2. The information-handling system according to claim 1, wherein the CSI configuration information comprises configuration information for a time-domain-based CSI-RS process in which the measured CSI-RS information for each respective CSI-RS group is measured with a different time offset from other CSI-RS groups, a frequency-domain-based CSI-RS process in which the measured CSI-RS information for each respective CSI-RS group is measured in different Physical Resource Blocks (PRBs) that have been interlaced in the frequency domain, a code-domain-based CSI-RS process, or a combination thereof.

3. The method according to claim 1, wherein the CSI configuration information comprises configuration information for a code-domain-based CSI-RS process that is initialized specifically for the wireless terminal device.

4. The method according to claim 1, further comprising:

receiving at an evolved Node B (eNB) of the 3GPP LTE wireless network the feedback CSI-RS information; and selecting the at least one vertical precoding vector for configuring the CSI-RS ports of the 3D antenna arrangement.

5. The method according to claim 4, wherein the at least one selected vertical precoding vector comprises $$W_V = [W_V^1, W_V^2, \ldots, W_V^{r_V}]$$

in which $W_V^i$ for i=1, 2, . . . , $r_V$ comprises a $N_V \times 1$ vector, $N_V$ represents the number of antenna ports having the same index and in which $r_V$ represents the number of vertical rank in MIMO transmission.

6. The method according to claim 5, wherein the at least one selected vertical precoding vector is selected based on a number of antenna ports comprising a same index and to correspond to horizontal precoding vectors comprising the same antenna port index.

7. The method according to claim 6, wherein $$W_V^i = \begin{bmatrix} 1 \\ \exp\left(-j2\pi \frac{d}{\lambda}\cos(\theta^i)\right) \\ \vdots \\ \exp\left(-j2\pi \frac{r_V d}{\lambda}\cos(\theta^i)\right) \end{bmatrix}, 0 < \theta^i < \pi$$

in which d comprises a distance between different antenna elements and $\lambda$ comprises a wavelength.

8. A method to select at least one precoding vector for a three-dimensional Multiple Input Multiple Output (3D-MIMO) configuration of a $3^{rd}$ Generation Partnership Project Long Term Evolution (3GPP LTE) wireless network, the method comprising:

sending from an evolved Node B (eNB) of the 3GPP LTE wireless network to a wireless terminal device Channel State Information (CSI) configuration information for a plurality of Channel State Information-Reference Signal (CSI-RS) ports at the eNB, the plurality of CSI-RS ports corresponding to a 3D arrangement of antennas and being grouped into a plurality of CSI-RS port groups, wherein the plurality of CSI-RS ports comprises greater than eight CSI-RS ports, and wherein each of the plurality of CSI-RS port groups comprises a corresponding CSI process, and wherein a first combination of the CSI processes is performed in a first group of physical resource blocks, and a second combination of the CSI processes performed in a second group of physical resource blocks, the second combination being different from the first combination; and receiving at the eNB from the wireless terminal device CSI-RS information as feedback; and selecting at least one vertical precoding vector for configuring the CSI-RS ports of the 3D antenna arrangement.

9. The information-handling system according to claim 8, wherein the CSI configuration information comprises configuration information for a time-domain-based CSI-RS process in which the measured CSI-RS information for each respective CSI-RS group is measured with a different time offset from other CSI-RS groups, a frequency-domain-based CSI-RS process in which the measured CSI-RS information for each respective CSI-RS group is measured in different Physical Resource Blocks (PRBs) that have been interlaced in the frequency domain, a code-domain-based CSI-RS process, or a combination thereof.

10. The method according to claim 8, wherein the CSI configuration information comprises configuration information for a code-domain-based CSI-RS process that is initialized specifically for the wireless terminal device.

11. The method according to claim 8, wherein the at least one selected vertical precoding vector comprises $$W_V = [W_V^1, W_V^2, \ldots, W_V^{r_V}]$$

in which $W_V^i$ for $i=1, 2, \ldots, r_V$ comprises a $N_V \times 1$ vector, $N_V$ represents the number of antenna ports having the same index and in which $r_V$ represents the number of vertical rank in MIMO transmission.

12. The method according to claim 11, wherein the at least one selected vertical precoding vector is selected based on a number of antenna ports comprising a same index and to correspond to horizontal precoding vectors comprising the same antenna port index.

13. The method according to claim 11, wherein $$W_V^i = \begin{bmatrix} 1 \\ \exp\left(-j2\pi\frac{d}{\lambda}\cos(\theta^i)\right) \\ \vdots \\ \exp\left(-j2\pi\frac{r_V d}{\lambda}\cos(\theta^i)\right) \end{bmatrix}, 0 < \theta^i < \pi$$

in which d comprises a distance between different antenna elements and $\lambda$ comprises a wavelength.

14. An information-handling system, comprising:
a receiver capable of receiving a $3^{rd}$ Generation Partnership Project (3GPP) Long Term Evolution (LTE) signal containing Channel State Information (CSI) configuration information for a plurality of CSI-RS ports, the plurality of CSI-RS ports corresponding to a 3D arrangement of antennas and being grouped into a plurality of CSI-RS port groups, wherein the plurality of CSI-RS ports comprises greater than eight CSI-RS ports, and wherein each of the plurality of CSI-RS port groups comprises a corresponding CSI process;
a processor coupled to the receiver, the processor being configured to
measure CSI-RS information corresponding to each respective CSI-RS group, wherein a first combination of the CSI processes is performed in a first group of physical resource blocks, and a second combination of the CSI processes performed in a second group of physical resource blocks, the second combination being different from the first combination, until CSI-RS measurements have been obtained for the greater than eight CSI-RS ports; and
send the CSI-RS information as feedback for selecting at least one vertical precoding vector for configuring the CSI-RS ports of the 3D antenna arrangement.

15. The information-handling system according to claim 14, wherein the CSI configuration information comprises configuration information for a time-domain-based CSI-RS process in which the measured CSI-RS information for each respective CSI-RS group is measured with a different time offset from other CSI-RS groups, a frequency-domain-based CSI-RS process in which the measured CSI-RS information for each respective CSI-RS group is measured in different Physical Resource Blocks (PRBs) that have been interlaced in the frequency domain, a code-domain-based CSI-RS process, or a combination thereof.

16. The information-handling system according to claim 14, wherein the CSI configuration information comprises configuration information for a code-domain-based CSI-RS process that is initialized specifically for the wireless terminal device.

17. The information-handling system according to claim 14, wherein the information-handling system comprises a cellular telephone, smartphone, smart-type device, or tablet-type device.

18. The information-handling system according to claim 17, wherein the cellular telephone, smartphone, smart-type device, or tablet-type device further comprises a touchscreen display capable of receiving input information from a touch of a user or a stylus.

19. An information-handling system, comprising:
a transmitter capable of transmitting a $3^{rd}$ Generation Partnership Project (3GPP) Long Term Evolution (LTE) signal containing Channel State Information (CSI) configuration information for a plurality of CSI-RS ports, the plurality of CSI-RS ports corresponding to a 3D arrangement of antennas and being grouped into a plurality of CSI-RS port groups, wherein the plurality of CSI-RS ports comprises greater than eight CSI-RS ports, and wherein each of the plurality of CSI-RS port groups comprises a corresponding CSI process, and wherein a first combination of the CSI processes is performed in a first group of physical resource blocks, and a second combination of the CSI processes performed in a second group of physical resource blocks, the second combination being different from the first combination;
a receiver capable of receiving CSI-RS information as feedback; and
a processor coupled to the receiver configured to select at least one vertical precoding vector for configuring the CSI-RS ports of the 3D antenna arrangement.

20. The information-handling system according to claim 19, wherein the CSI configuration information comprises configuration information for a time-domain-based CSI-RS process in which the measured CSI-RS information for each respective CSI-RS group is measured with a different time offset from other CSI-RS groups, a frequency-domain-based CSI-RS process in which the measured CSI-RS information for each respective CSI-RS group is measured in different Physical Resource Blocks (PRBs) that have been interlaced in the frequency domain, a code-domain-based CSI-RS process, or a combination thereof.

21. The information-handling system according to claim 19, wherein the CSI configuration information comprises configuration information for a code-domain-based CSI-RS process that is initialized specifically for the wireless terminal device.

22. The information-handling system according to claim 19, wherein the at least one selected vertical precoding vector comprises $$W_V = [W_V^1, W_V^2, \ldots, W_V^{r_V}]$$

in which $W_V^i$ for $i=1, 2, \ldots, r_V$ comprises a $N_V \times 1$ vector, $N_V$ represents the number of antenna ports having the same index and in which $r_V$ represents the number of vertical rank in MIMO transmission.

23. The information-handling system according to claim 22, wherein the at least one selected vertical precoding vector is selected based on a number of antenna ports comprising a same index and to correspond to horizontal precoding vectors comprising the same antenna port index.

24. The information-handling system according to claim 22, wherein $$W_V^i = \begin{bmatrix} 1 \\ \exp\left(-j2\pi \frac{d}{\lambda}\cos(\theta^i)\right) \\ \vdots \\ \exp\left(-j2\pi \frac{r_V d}{\lambda}\cos(\theta^i)\right) \end{bmatrix}, 0 < \theta^i < \pi$$

in which d comprises a distance between different antenna elements and $\lambda$ comprises a wavelength.

* * * * *